Figure 1:
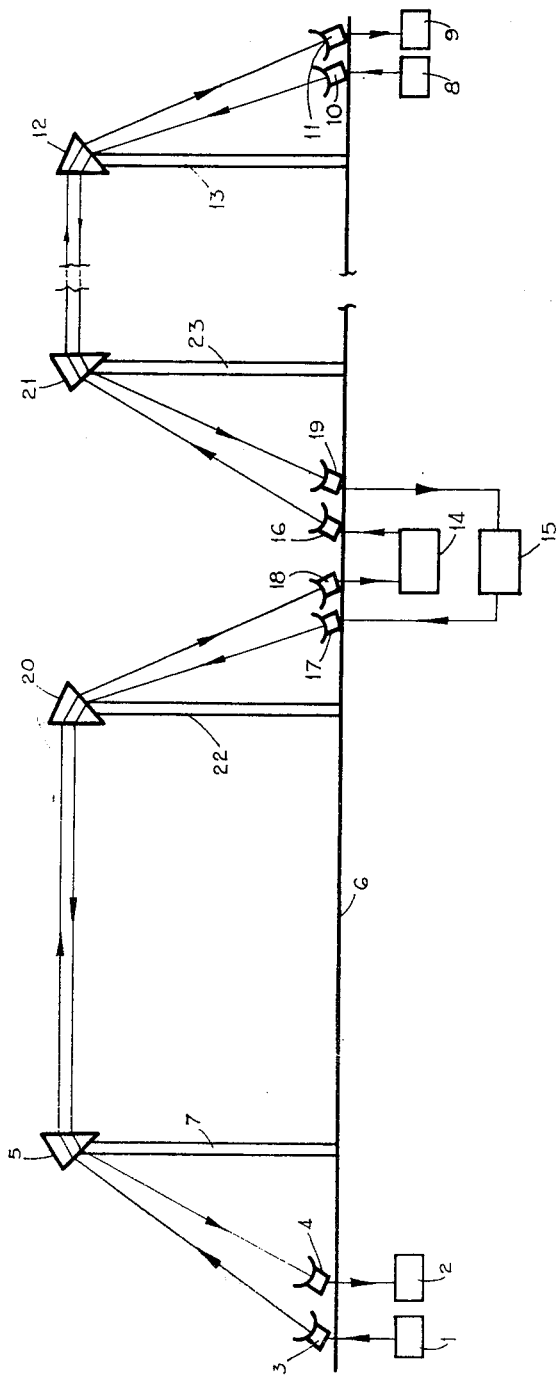

Feb. 9, 1954  J. M. T. EVANS  2,668,907
ULTRAHIGH-FREQUENCY RADIO SIGNALING SYSTEM
Filed Oct. 10, 1950  2 Sheets-Sheet 1

INVENTOR
JOHN MICHAEL THOMPSON EVANS
BY
ATTORNEY

Feb. 9, 1954   J. M. T. EVANS   2,668,907
ULTRAHIGH-FREQUENCY RADIO SIGNALING SYSTEM
Filed Oct. 10, 1950   2 Sheets-Sheet 2

INVENTOR
JOHN MICHAEL THOMPSON EVANS
BY
ATTORNEY

UNITED STATES PATENT OFFICE 2,668,907

ULTRAHIGH-FREQUENCY RADIO SIGNALING SYSTEM

John Michael Thompson Evans, London, England, assignor to The General Electric Company Limited, London, England Application October 10, 1950, Serial No. 189,393

Claims priority, application Great Britain October 25, 1949

2 Claims. (Cl. 250—15)

This invention relates to ultra-high frequency radio signalling systems for two-way point-to-point communication.

In such systems it is common practice to elevate the transmitting and receiving aerials at each station so that they are in a direct line of sight with the aerials at the other station. If the rest of the transmitting and/or receiving apparatus at the station is disposed at ground level, long leads between this apparatus and the aerial or aerials are necessary, and this may be disadvantageous. However it may be inconvenient to elevate this apparatus to the same level as the aerial or aerials so as to shorten the necessary length of the leads.

It has been proposed to overcome these difficulties by locating the aerial or aerials at a station at ground level and providing an elevated plane reflector at the station for reflecting the transmitted and received beams of radio waves in the required direction. Thus a transmitting aerial at the station is arranged to transmit a narrow beam of radio waves towards the reflector where the beam is reflected towards a similar reflector at a second station. Similarly a beam of radio waves received at the station is arranged to be reflected by the reflector in the direction of a receiving aerial.

Several disadvantages are encountered with this arrangement. Thus, angular rotations of the reflector result in an angular rotation of the direction of the reflected beam which may be comparable with the angular width of the beam. Angular rotations of the reflector due to wind effects may thus have a considerable deleterious effect on the efficiency of the system. Furthermore it is necessary that the angular position of the reflector should be very accurately adjusted. Further disadvantages of the arrangement arise because separate transmitting and receiving aerials are used at the same station, since it is necessary to arrange that the angles through which the transmitted and received beams are deviated by the reflector should be different. This necessitates the provision of two effective reflecting surfaces inclined at a small angle to each other, and in order to ensure that the transmitted and received beams are reflected by the correct surfaces it is necessary for the radio waves in the two beams to be polarised in different directions, thus complicating the necessary transmitting and receiving equipment. Furthermore precise adjustment of the correct angular positions of the reflectors at each station is difficult.

It is an object of the present invention to provide an ultra-high frequency radio signalling system for two-way point-to-point communication in which the above mentioned disadvantages of both the arrangements utilising elevated aerials and the arrangements utilising reflectors may be substantially overcome.

According to the present invention, in an ultra-high frequency radio signalling system for two-way point-to-point communication the apparatus at each station comprises in combination a prismatic device adapted to refract ultra-high frequency radio waves and having a refractive index which is variable with frequency, a transmitting aerial disposed at or near ground level and adapted to transmit a narrow beam of radio waves of predetermined ultra-high frequency in the direction of the prismatic device, and a receiving aerial disposed at or near ground level and adapted to receive a narrow beam of radio waves of predetermined ultra-high frequency which is transmitted from a second station of the system, the prismatic device being elevated above ground level and being disposed so that the beam transmitted by the transmitting aerial is refracted by the prismatic device so as to be directed towards the corresponding prismatic device of said second station and so that the beam transmitted from said second station via said corresponding prismatic device is refracted by the prismatic device so as to be directed towards the receiving aerial, and the arrangement being such that the frequencies of the radio waves in the beams transmitted to and received from said second station are different.

Since the refractive index of the prismatic device is variable with frequency, the two beams are deviated through different angles and there is therefore no need for the radio waves in the two beams to be polarised in different directions. Also correct adjustment of the angular positions of the prismatic devices at the two stations is much easier than is the corresponding adjustment of reflectors when these are used.

Preferably at each station the prismatic device and the aerial system are disposed so that the angle through which a beam transmitted from or received by any aerial of the aerial system is deviated by the prismatic device is approximately equal to the angle of minimum deviation for the frequency of the radio waves in that beam. With this arrangement, angular rotation of the prismatic device has a comparatively small effect on the angle through which the beam is deviated by the prismatic device. Thus the effect of winds is considerably reduced as compared with the arrangements in which reflectors are used, and the necessity for precise adjustment of the angular position of the prismatic device is not so great as is the necessity for precise adjustment of the angular position of a reflector.

Figure 2:
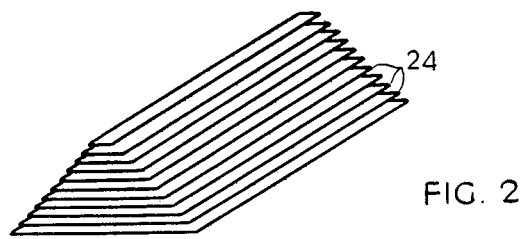
Figure 3:
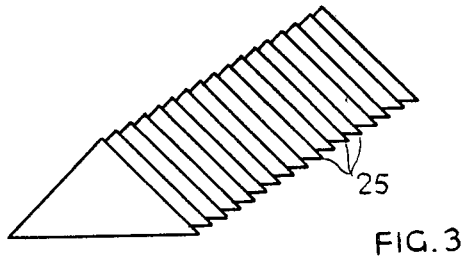

One arrangement in accordance with the present invention will now be described, by way of example, with reference to the accompanying drawings, in which:

Figure 1 is a diagrammatic representation of an ultra-high frequency radio signalling system for two-way communication between two terminal stations via a repeater station; and Figures 2 and 3 show respectively two forms of prismatic device which may be used in the system illustrated in Figure 1.

The apparatus at the first terminal station of the system comprises a radio transmitter 1 and receiver 2, transmitting and receiving aerials 3 and 4 respectively, which are suitably of the parabolic reflector type, and a prismatic device 5 elevated above the level of the ground 6 at the top of a mast 7. The apparatus at the second terminal station of the system comprises a radio transmitter 8 and receiver 9, transmitting and receiving aerials 10 and 11 respectively similar to the aerials 3 and 4, and a prismatic device 12 elevated above the level of the ground 6 at the top of a mast 13. The apparatus at the repeater station of the system comprises two signal translating systems 14 and 15 two transmitting aerials 16 and 17, two receiving aerials 18 and 19, and two prismatic devices 20 and 21 elevated above the level of the ground 6 at the top of masts 22 and 23 respectively.

The aerials 3, 4, 10, 11, 16, 17, 18 and 19 are disposed at ground level and are connected by as short leads as possible to their associated transmitting and receiving apparatus comprised by the transmitters 1 and 8, the receivers 2 and 9, and the signal translating systems 14 and 15, all of which are also disposed at ground level. The prismatic devices 5 and 20 are arranged to be in a direct line of sight from each other, as are the prismatic devices 12 and 21.

The operation of the system is as follows. A signal generated at the transmitter 1 is transmitted on an ultra-high frequency carrier via the aerial 3, which radiates a narrow beam of radio waves in the direction of the prismatic device 5. The beam is refracted by the prismatic device 5 so that it is directed towards the prismatic device 20 at the repeater station. The beam is again refracted by the prismatic device 20 so that it is directed towards the aerial 18. From the aerial 18 the signal is passed to the translating system 14, where the carrier frequency is changed to a relatively low value and the signal is amplified. The signal is retransmitted on an ultra-high frequency carrier via the aerial 16, which radiates a narrow beam of radio waves in the direction of the prismatic device 21. The beam is refracted by the prismatic device 21 so that it is directed towards the prismatic device 12 at the second terminal station. The beam is again refracted by the prismatic device 12 so that it is directed towards the aerial 11, from which it is finally passed to the receiver.

Transmission in the opposite direction is carried out in the same way. A signal generated at the transmitter 8 is transmitted on an ultra-high frequency carrier via the aerial 10, which radiates a narrow beam of radio waves in the direction of the prismatic device 12. The beam is refracted by the prismatic device 12 so that it is directed towards the prismatic device 21 at the repeater station. The beam is again refracted by the prismatic device 21 so that it is directed towards the aerial 19. From the aerial 19 the signal is passed to the translating system 15, where the carrier frequency is changed to a relatively low value and the signal is amplified. The signal is retransmitted on an ultra-high frequency carrier via the aerial 17, which radiates a narrow beam of radio waves in the direction of the prismatic device 20. The beam is refracted by the prismatic device 20 so that it is directed towards the prismatic device 5 at the first terminal station. The beam is again refracted by the prismatic device 5 so that it is directed towards the aerial 4, for which it is finally passed to the receiver 2.

Different carrier frequencies are used for transmission in opposite directions between both the first and second terminal stations and the repeater station.

The dispositions of the prismatic devices 5, 12, 20 and 21 and the aerials 3, 4, 10, 11, 16, 17, 18 and 19 are preferably such that the angle through which each beam of radio waves is deviated is approximately equal to the angle of minimum deviation, for the reasons mentioned above.

Two forms which the prismatic devices 5, 12, 20 and 21 may take are illustrated in Figures 2 and 3. In the form shown in Figure 2, the prismatic device comprises a plurality of parallel rectangular metal plates 24 spaced apart by equal distances, the plates 24 having equal lengths but having widths which decrease regularly from plate to plate in a direction perpendicular to the plates 24, and the device being symmetrical about a plane passing through all the longitudinal axes of the plates 24. In the form shown in Figure 3, the prismatic device comprises a plurality of identical parallel metal plates 25 each in the form of an isosceles triangle, the plates 25 being spaced apart by equal distances and the device being symmetrical about a plane passing through the bisector of the angle at the apex of each of the plates 25. In each case the plates 24 or 25 may be separated by air and be supported by a suitable framework, or they may be incorporated in a sandwich construction in which they are separated by a suitable insulating material.

In the case of both the constructions shown in Figures 2 and 3, adjacent pairs of the plates 24 or 25 form waveguides in which the phase velocity of the radio waves is greater than in free space, and the refractive index of such prismatic devices is thus less than unity. If prismatic devices of either of these types are used in the system illustrated in Figure 1, they will therefore be disposed, as shown in Figure 1, with their apexes downwards, though the plane of symmetry of each prismatic device will not in general be vertical.

It is to be understood that in this specification the term "prismatic device" is not restricted to devices having prismatic shape, but is intended to include also any other devices operable by virtue of the principles of refraction at plane surfaces as opposed to curved surfaces.

I claim:

1. An ultra-high frequency radio signalling system for two-way point-to-point communication including at least two stations, a prismatic device at each station for refracting ultra-high frequency radio waves, each said device having a refractive index which is variable with frequency, means supporting each of said devices elevated above ground level with an apex pointing in the general direction of the ground, a transmitting aerial at each of said stations, each said transmitting aerial being disposed substantially at ground level and radiating a narrow beam of radio waves of predetermined ultra-high frequency in the direction of the prismatic device at such station, and a receiving aerial at each station, each said receiving aerial being disposed substantially at ground level and oriented to receive a narrow beam of radio waves of predetermined ultra-high frequency emanating from the prismatic device at such station, the prismatic device at each station being so oriented that the bisector of its lower apex angle bisects the angle between the interstation wave and the device-to-aerial wave, the prismatic devices and the transmitting and receiving aerials being so oriented that the beam transmitted by a transmitting aerial is refracted by the associated prismatic device in a direction toward the prismatic device at the other station and so that the beam transmitted from the second station via its prismatic device is refracted by that prismatic device so as to be directed toward the associated receiving aerial, the frequencies of the radio waves in the beams transmitted to and received from the second station being different.

2. A repeater station for an ultra-high frequency radio point-to-point signalling system between two remote stations, said repeater station comprising two prismatic devices for refracting ultra-high frequency radio waves, means mounting said devices in positions elevated above ground level with an apex of each device pointing in the general direction of the ground, a transmitting aerial disposed substantially at ground level and oriented for transmitting a narrow beam of radio waves of predetermined ultra-high frequency in the direction of one of the prismatic devices, a receiving aerial disposed substantially at ground level and oriented for receiving a narrow beam of radio waves of predetermined ultra-high frequency which is radiated by the other of said prismatic devices, and means to transfer signals received by the receiving aerial to the transmitting aerial for re-transmission, each said prismatic device being so oriented that the bisector of its lower apex angle bisects the angle between the wave from the said device and the associated aerial and the wave from said prism and the associated remote station, the prismatic devices and the aerials being so disposed that the beam transmitted by the transmitting aerial is refracted by the associated prismatic device so as to be directed toward one of the remote stations and the beam from the other remote station is refracted by the other prismatic device toward the receiving aerial.

JOHN MICHAEL THOMPSON EVANS.

References Cited in the file of this patent

UNITED STATES PATENTS

| Number | Name | Date |
|---|---|---|
| 1,939,345 | Gerth et al. | Dec. 12, 1933 |
| 2,042,302 | Frantz et al. | May 26, 1936 |
| 2,508,479 | Wheeler | May 23, 1950 |
| 2,511,610 | Wheeler | June 12, 1950 |
| 2,530,826 | Koch | Nov. 21, 1950 |